US011909141B2

(12) United States Patent
Raybold

(10) Patent No.: US 11,909,141 B2
(45) Date of Patent: Feb. 20, 2024

(54) SEALED CONNECTOR FOR FLAT FLEXIBLE CABLES

(71) Applicant: TE Connectivity Solutions GmbH, Schaffhausen (CH)

(72) Inventor: Christopher Ryan Raybold, Middletown, PA (US)

(73) Assignee: TE Connectivity Solutions GmbH (CH)

(*) Notice: Subject to any disclaimer, the term of this patent is extended or adjusted under 35 U.S.C. 154(b) by 17 days.

(21) Appl. No.: 17/724,723

(22) Filed: Apr. 20, 2022

(65) Prior Publication Data

US 2023/0344165 A1 Oct. 26, 2023

(51) Int. Cl.
*H01R 13/52* (2006.01)
*H01R 12/77* (2011.01)
*H01R 13/506* (2006.01)

(52) U.S. Cl.
CPC ....... *H01R 13/5205* (2013.01); *H01R 12/774* (2013.01); *H01R 13/506* (2013.01)

(58) Field of Classification Search
CPC ....... H01R 12/59; H01R 12/77; H01R 12/771
See application file for complete search history.

(56) References Cited

U.S. PATENT DOCUMENTS

| | | | | |
|---|---|---|---|---|
| 6,409,541 | B1 * | 6/2002 | Hattori | H01R 43/24 439/604 |
| 7,354,308 | B2 * | 4/2008 | Iwahori | H01R 13/5205 439/587 |
| 11,469,539 | B2 * | 10/2022 | Lee | H01R 12/774 |
| 2013/0137293 | A1 * | 5/2013 | Miura | H01R 13/5205 439/499 |

* cited by examiner

*Primary Examiner* — Briggitte R. Hammond

(57) ABSTRACT

A connector comprises a housing defining a receptacle sized to receive a flat flexible cable. A conductive terminal is arranged within the receptacle and adapted to contact an exposed conductor of the flat flexible cable received within the receptacle. A seal is positioned in contact with a front end of the housing and defines a cable receiving slot therethrough aligned with the receptacle. A cover is arranged over the seal and includes a slotted opening aligned with the cable receiving slot of the seal and the receptacle. The cover selectively fixed to the front end of the housing.

23 Claims, 8 Drawing Sheets

SEALED CONNECTOR FOR FLAT FLEXIBLE CABLES

FIELD OF THE INVENTION

The present invention relates to electrical connectors, and more particularly, to a sealed electrical connector for a flat flexible cable.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

A critical obstacle preventing the implementation of FFCs into these applications includes the need to develop quick, robust, and low resistance termination techniques which enable an FFC to be mating with various components. Moreover, these applications often subject the FFCs and their associated connectors to harsh environmental conditions, such as dirt and moisture. Accordingly, reliably terminating the FFCs includes sealing their connectors from these elements. However, reliably creating a seal about an FFC, as well as sealing the mating connectors associated therewith, has proven challenging.

Accordingly, cost effective and reliable solutions for connectorizing and sealing FFC assemblies are desired.

SUMMARY

In one embodiment of the present disclosure, a connector includes a housing defining a receptacle sized to receive a flat flexible cable. A conductive terminal is arranged within the receptacle and adapted to contact an exposed conductor of the flat flexible cable received within the receptacle. A seal is positioned in contact with a front end of the housing and includes a cable receiving slot defined therethrough and aligned with the receptacle. A cover is arranged over the seal and includes a slotted opening aligned with the cable receiving slot of the seal and the receptacle. The cover is selectively fixable to the front end of the housing.

BRIEF DESCRIPTION OF THE DRAWINGS

The invention will now be described by way of example with reference to the accompanying Figures, of which.

DETAILED DESCRIPTION OF THE EMBODIMENTS

Figure 1:
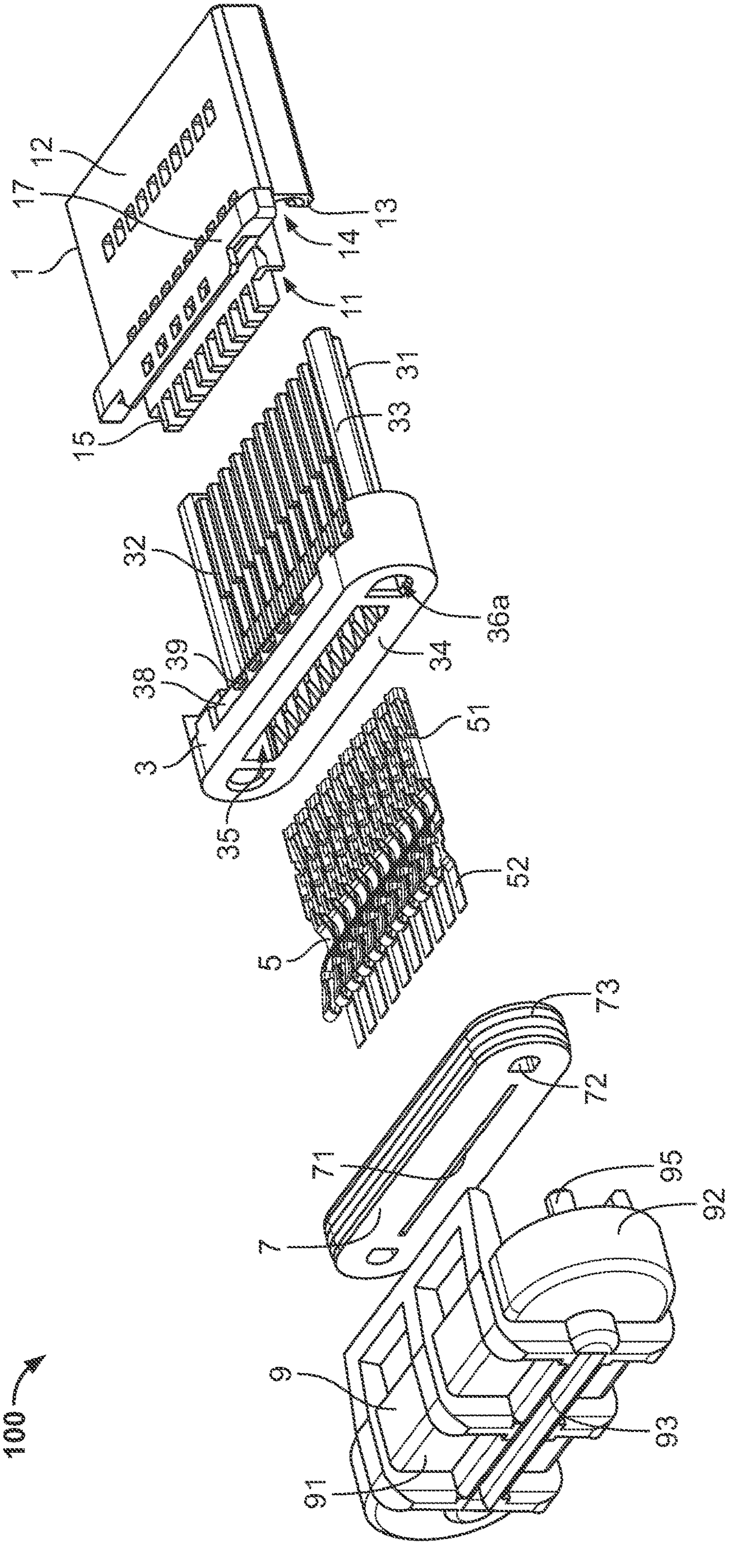
FIG. 1 is an exploded perspective view of a sealed connector for a flat flexible cable according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a sealed electrical connector for use with a flat flexible cable (FFC) or flat printed cable (FPC). An exemplary FFC includes a plurality of conductors embedded within an insulation material. One or more windows are formed through the insulation material for exposing a portion of each of the conductors proximate an end of the cable. The connector includes a housing comprising an outer housing and an inner housing slidably received within the outer housing. The inner and outer housings defining a receptacle for receiving the FFC. A plurality of self-locking conductive terminals are arranged within the receptacle for contacting a respective one of the exposed conductors of the FFC. A seal engages with the housing proximate an open end of the receptacle and defines a slot therethrough aligned with the receptacle for receiving the FFC. A cover is provided for mating to the housing on the open end thereof and defines a slotted opening corresponding to the slot of the seal for receiving the FFC. The seal is arranged within the cover and engages with a front face of the housing for sealing the receptacle when the cover is fitted to the housing. Further, the seal defines a perimeter surface extending beyond the housing in the radial direction for engaging with a sealing surface of a mating connector or header. In this way, a single sealing element is provided for sealing around a perimeter of the FFC, as well as sealing the entire connector assembly when in a mated stated.

Figure 2:
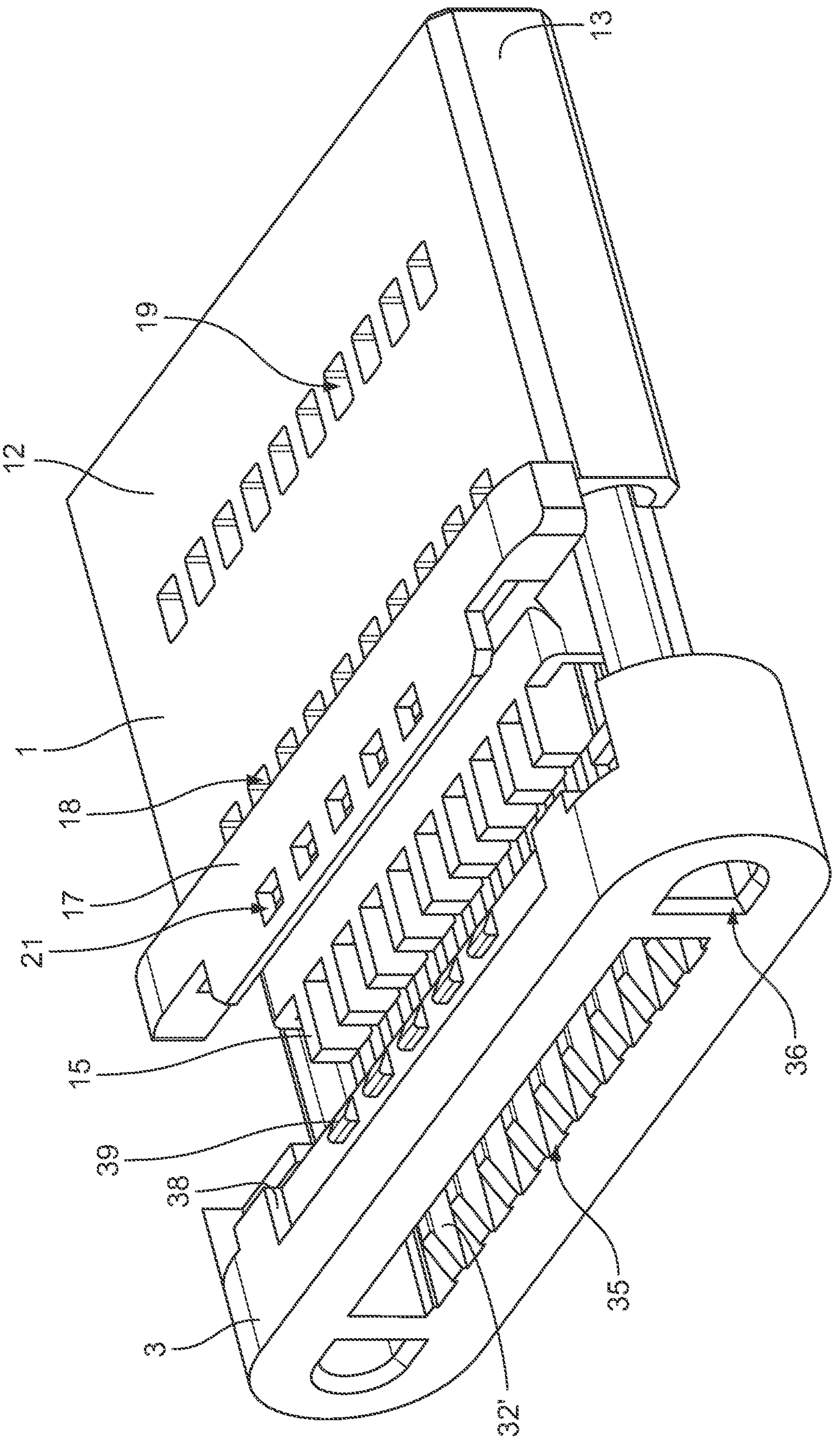
FIG. 2 is a perspective view of a housing of the connector of FIG. 1 in a pre-stage position or state.

As shown in FIGS. 1 and 2, a connector or connector assembly 100 according to an embodiment of the present disclosure is adapted for use with an FFC, such as the exemplary illustrated segment of an FFC 200 as shown in FIGS. 8-12. The connector 100 comprises a housing or housing assembly including an outer housing 1 and an inner housing 3 slidably received within the outer housing. A plurality of conductive terminals 5 are arranged within the housing 1,3 for electrically contacting exposed conductors of an FFC. The connector 100 further comprises a seal 7 and a cover 9. The cover 9 is selectively fixable to a front end 34 of the inner housing 3

Figure 4:
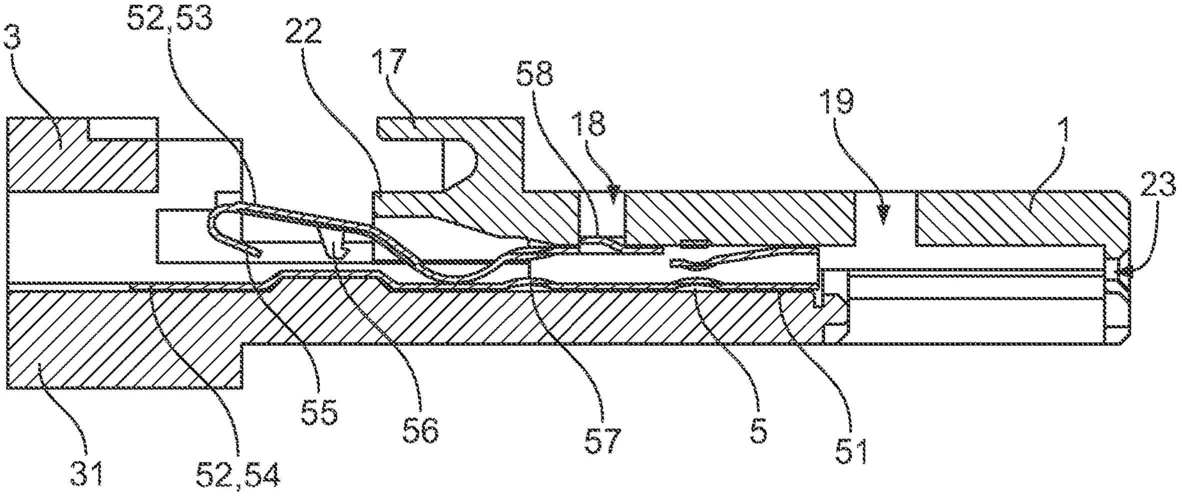
FIG. 4 is a side cross-sectional view of the housing of FIG. 3.

The outer housing 1 defines an opening 11 sized to slidably receive at least a rear portion 33 of the inner housing 3. Specifically, sidewalls 13 of the outer housing 1 may include a flange-like end (e.g., J-shaped) defining a channel 14 for engaging with a corresponding sidewall of the inner housing 3 in a sliding manner. The outer housing 1 further defines a plurality of partial vertical partitioning walls 15 extending downwardly from a top wall 12 thereof. A latching lever 17 is formed on the top wall 12 of the outer housing 1 and provides a means to apply a sliding force thereon, as well as to secure the outer housing to the inner housing 3. The top wall 12 includes a plurality of first apertures 18 extending therethrough for receiving an elastic latching tab 58 of the each terminal 5, as shown in FIG. 4. A plurality of second openings or apertures 19 are also formed through the top wall 12 and serve as inspection openings permitting a user to view at least a contact or terminating portion 51 of the terminal 5. In this way, the second apertures 19 enable a visual verification of a properly mated connector or terminal. As shown in FIG. 4, a plurality of openings 23 are formed on a rear wall of the outer housing 1, opposite the opening 11, and sized to receive conductive terminals of a mating connector, such as a mating header 8 shown in FIGS. 11 and 12.

The front end 34 of the inner housing 3 defines an opening 35 for receiving a flat flexible cable therethrough. A bottom wall 31 of the inner housing 3 includes a plurality of partial vertical partitioning walls 32 extending upwardly therefrom. The partitioning walls 15,32 of the outer and inner housings 1,3 are aligned with each other when the inner housing is installed within the outer housing, creating partitioning walls extending between the top and bottom walls 12,31. The partitioning walls 15,32 define a plurality of terminal receptacles sized to receive the plurality of conductive terminals 5 therein.

The front end 34 further defines two latch openings 36 adapted to receive latching protrusions 95 defined on the cover 9. The front end 34 of the inner housing 3 further defines a recess 38 for receiving a portion of the latching lever 17 of the outer housing 1. A plurality of catches 39 protrude from the recess 38 for engaging with openings 21 formed through the latching lever 17 for securing the inner and outer housings 3,1 together with the inner housing fully inserted into the outer housing.

Figure 3:
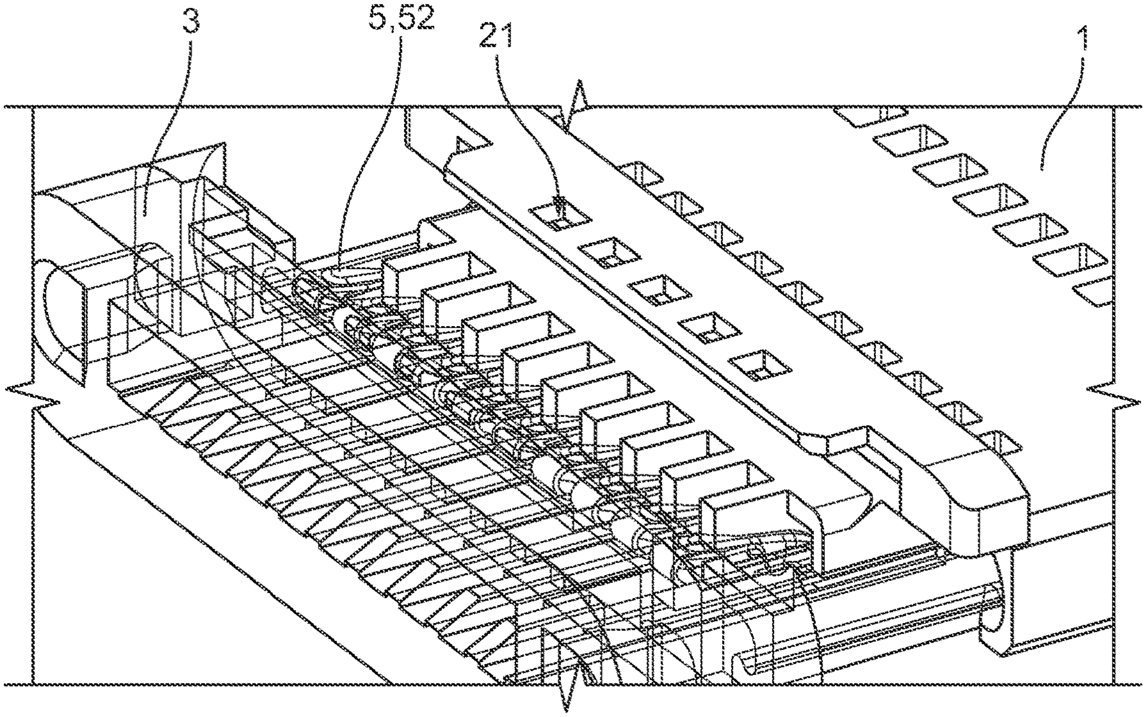
FIG. 3 is a perspective view of the housing of FIG. 2 having terminals inserted therein in the pre-stage position or state.

Referring now to FIGS. 2-4, the housing assembly is shown in an open or pre-staged state or position, after the terminals 5 have been installed within the terminal receptacles defined by the inner and outer housings 3,1. In the open state of the housing assembly, a clamping section 52 of each terminal 5 is in an open position for receiving a flat flexible cable between first and second arms 53,54 thereof. The contact or terminating portion 51 of each terminal 5 is aligned with a corresponding rear opening 23 for receiving and electrically contacting with a terminal of a mating connector received within the outer housing 1.

As can be seen most clearly in FIG. 4, a first arm 53 of the terminal 5 defines a generally U-shaped end portion having a free end facing in a direction of insertion of an FFC such that the FFC opposes a rounded or convex portion of the first arm as it is inserted into the receptacle opening 35. The free end of the first arm 53 is adapted to elastically engage with the exposed conductor of the FFC in the clamped position of the terminal 5. The outer housing 1 comprises a leading protruding surface 22 adapted to engage with the first arm 53 of the terminal as the inner housing 3 is slid relative to the outer housing in the horizontal direction (i.e., an axial direction or insertion direction). As the inner housing 3 is inserted into the outer housing 1, the protruding surface 22 engages with and biases the first arm 53 downwardly toward a second arm 54 of the terminal 5, clamping an exposed conductor of an FFC therebetween. The bottom wall 31 of the inner housing 3 defines protruding surfaces for engaging with complementary recessed contours 57 of the second arm 54 of the terminals 5, or vice-versa. The complementary features fix the position of the terminal 5 within its receptacle at least in the axial or insertion direction thereof, preventing the terminal from being inadvertently removed or displaced during use or transport.

Still referring to FIG. 4, the first arm 53 of the terminal 5 includes a fixing element or latch 56 adapted to engage with the second arm 54 for fixing the first arm in a clamped position relative to the second arm. Specifically, as the outer housing 1 biases the first arm 53 into the clamped position, the latch 56 engages with the second arm 54 and fixes the position of the first arm relative to the second arm. In this way, the terminals 5 may be described as self-locking spring clips.

The elastic latching tab or feature 58 extends from a top of the terminal and has a free end facing in a direction toward the clamping portion or end 52. With the terminal 5 installed within the housing assembly and the inner and outer housings 3,1 in the open position, the tab 58 is received within the opening 18, thereby preventing the outer housing 1 from being removed from the inner housing 3. In this way, once in the pre-stage state, the inner and outer housings 3,1 are secured to one another. In order to disassemble the inner and outer housings 3,1, the tabs 58 of each terminal 5 must be depressed. The terminals 5 may be formed from a conductive material, such as steel, copper or other alloys, and may be formed into the illustrated shape via, for example, bending operations performed on generally flat stock material.

Figure 5:
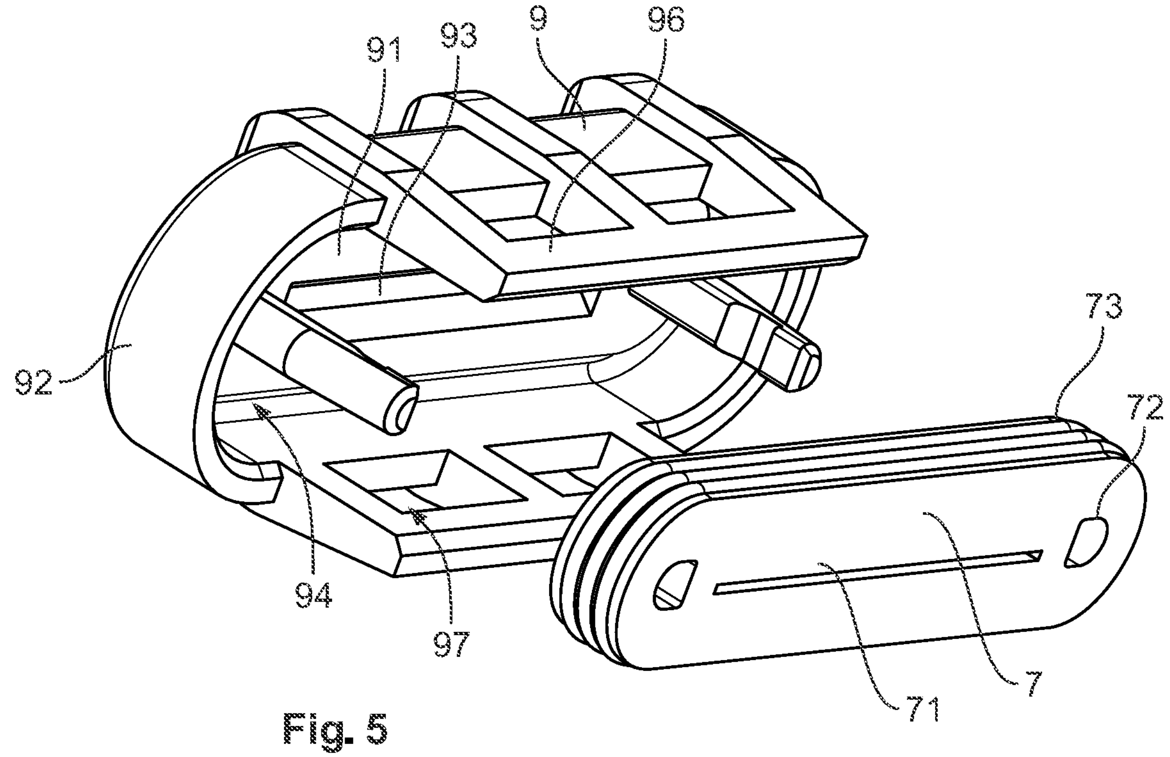
FIG. 5 is an exploded view of a cover and a seal of the connector of FIG. 1.
Figure 6:
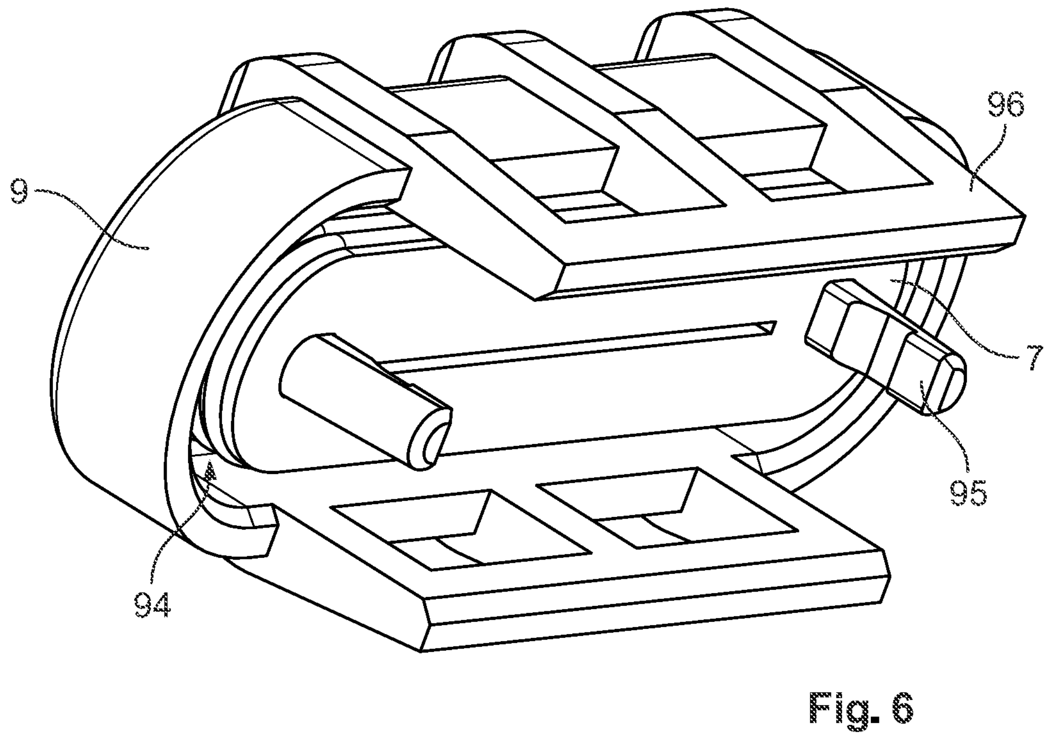
FIG. 6 is an assembled view of the seal and cover of FIG. 5.

As shown in FIGS. 1, 5, and 6, the seal 7 according to an exemplary embodiment of the present disclosure includes a body defining a slit or slot-shaped opening 71 formed therethrough adapted to receive a flat flexible cable in a sealing manner. In particular, the upper, lower and side surfaces of the slot 71 are adapted to sealingly contact corresponding top, bottom and side edges of the flat flexible cable. An outer peripheral surface 73 of the seal 7 defines a plurality of sealing ribs or ridges extending continuously therearound. Latch openings 72 are formed through the seal 7 for receiving the latching protrusions 95 of the cover 9.

With reference now to FIGS. 1 and 5-10, the cover 9 includes a body having a base 91 and a perimeter wall 92 extending therefrom. The base 91 and perimeter wall 92 define a cavity 94 for receiving the seal 7 therein. The base 91 defines a slot or opening 93 sized to receive a flat flexible cable therethrough. The slot 93 is aligned with the slot 71 formed in the seal 7 with the seal inserted within the cavity 94. Protruding latches or latch arms 95 extend from the base 91 and through the cavity 94 and the latch openings 72 of the seal 7 for engaging with the latch openings 36 of the inner housing 3. The latch openings 36 of the inner housing 3 define corresponding catching features therein for engaging with the latching surfaces of the latching protrusions 95, fixing the cover 9 onto the first end 34 of the inner housing 3. The fixation of the latching protrusions 95 with the latch openings 36 is sufficient to disengage the inner housing 3 from the outer housing 1 via the application of tension thereon. The latching protrusions 95 further function as locating features for aligning the seal 7 within the cover 9, and thus with the corresponding slot 93 receiving the flat flexible cable.

Figure 11:
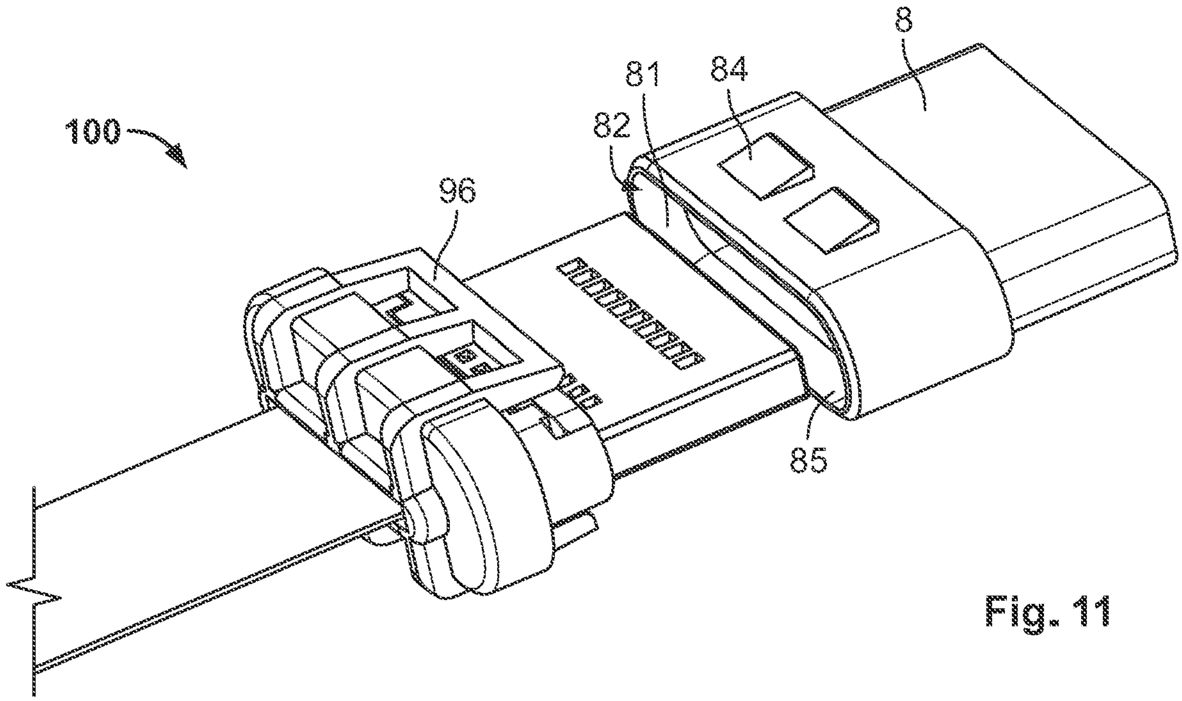
FIG. 11 is a side perspective view of the assembled connector and flat flexible cable of FIG. 10 positioned for insertion into a mating connector.
Figure 12:
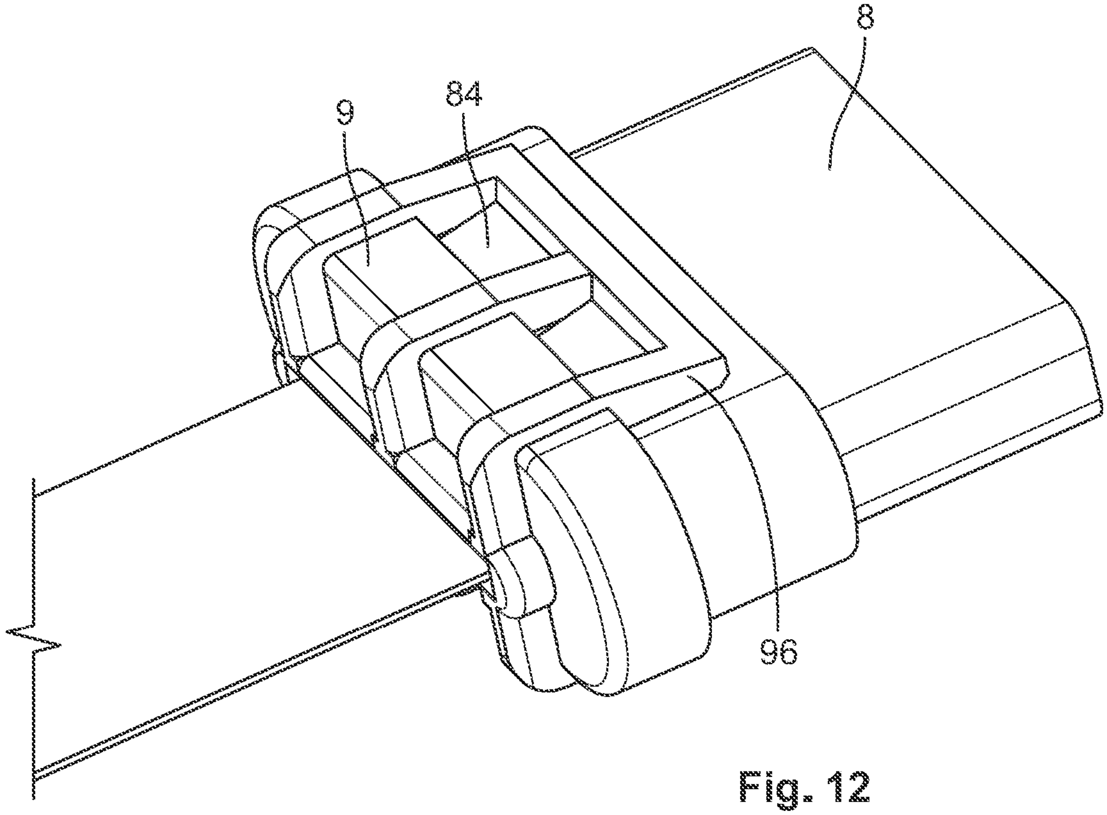
FIG. 12 is a side perspective view of a connector assembly including the connector and mating connector of FIG. 11.

The cover 9 includes latches 96 extending from an exterior of the perimeter wall 92 in the direction of the latching protrusions 95. The latches 96 define latch openings for receiving catches 84 defined on the mating connector or header 8, as shown in FIGS. 11 and 12. In this way, the cover 9 includes locking or latching features for securing to both the inner housing 3 and the mating connector 8, independently.

Figure 7:
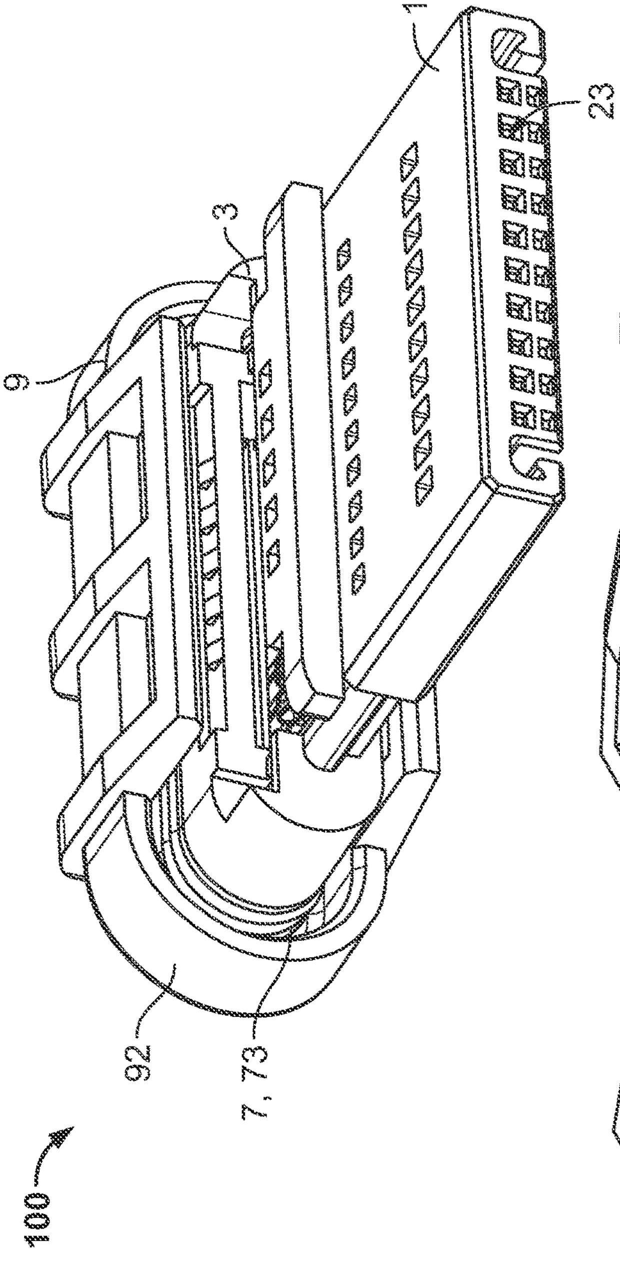
FIG. 7 is a rear perspective view of an assembled connector according to an embodiment of the present disclosure.
Figure 8:
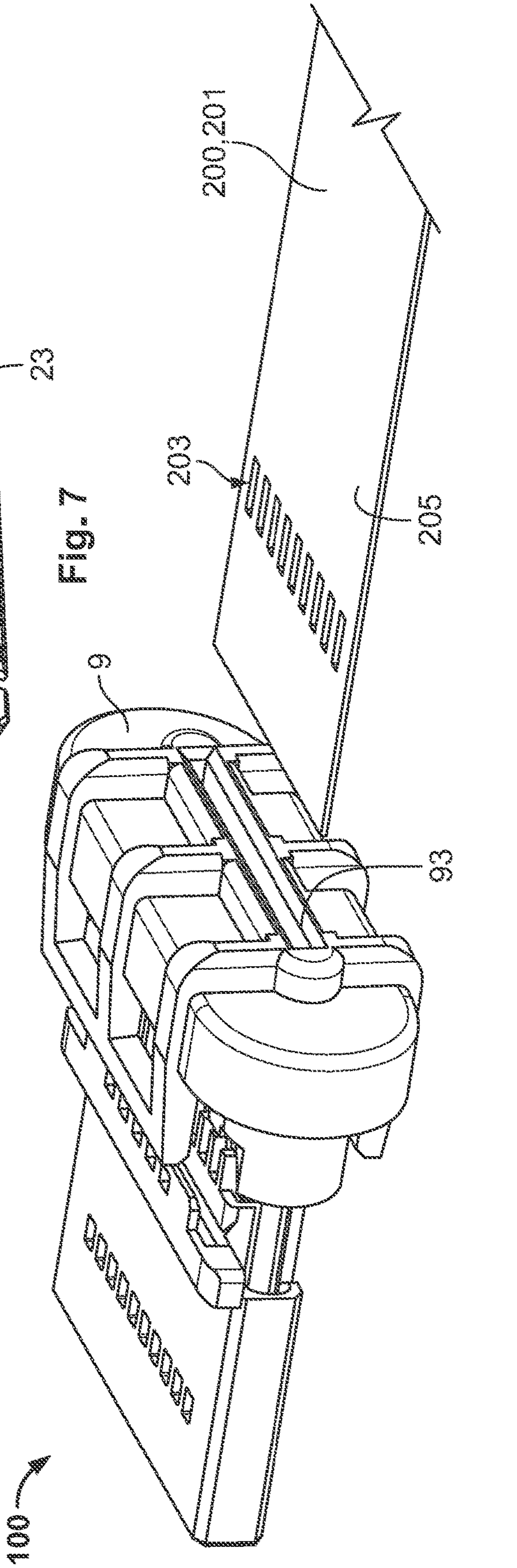
FIG. 8 is a side perspective view of the assembled connector of FIG. 7 with a flat flexible cable positioned for insertion therein.
Figure 9:
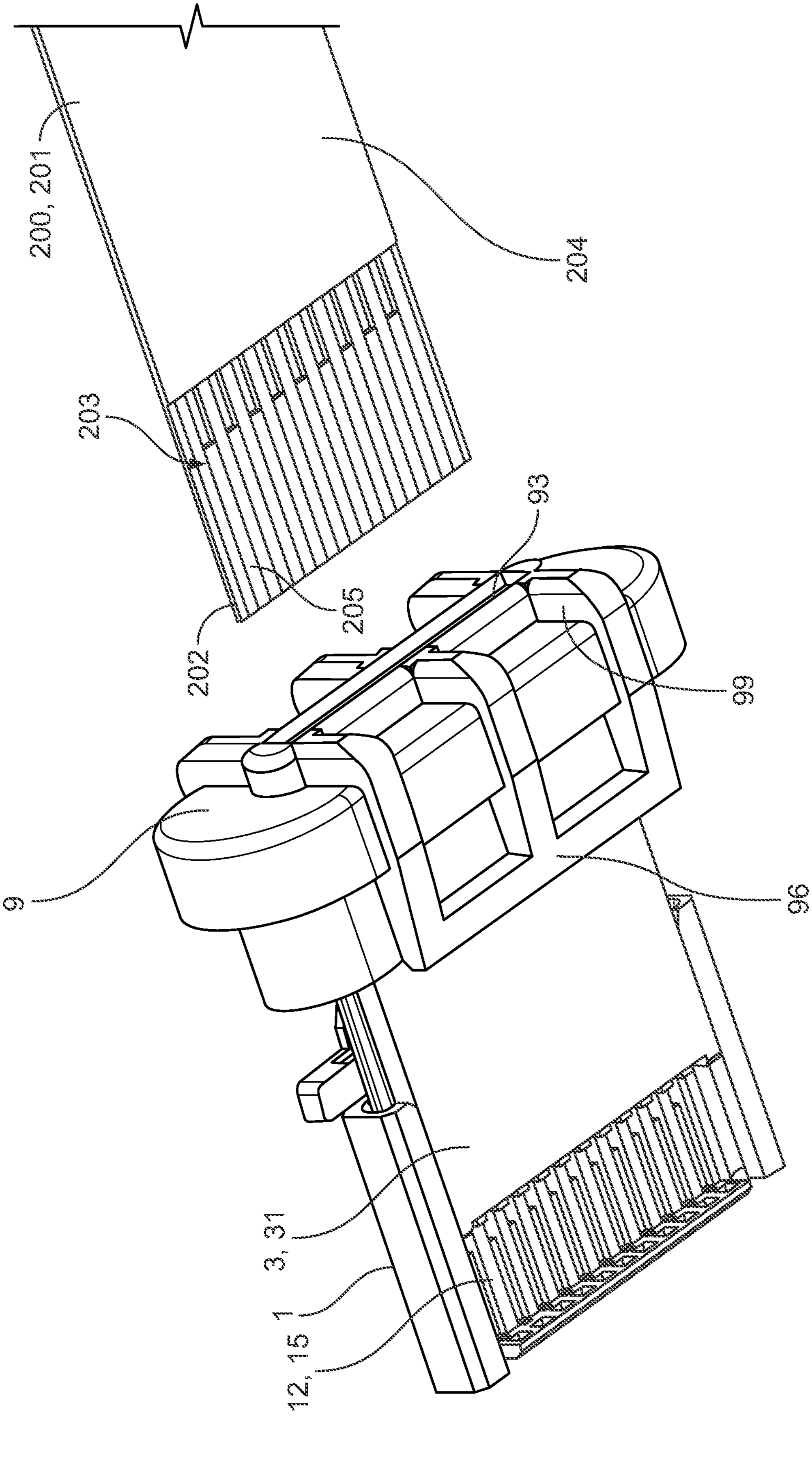
FIG. 9 is a bottom perspective view of the assembled connector and FFC of FIG. 8.
Figure 10:
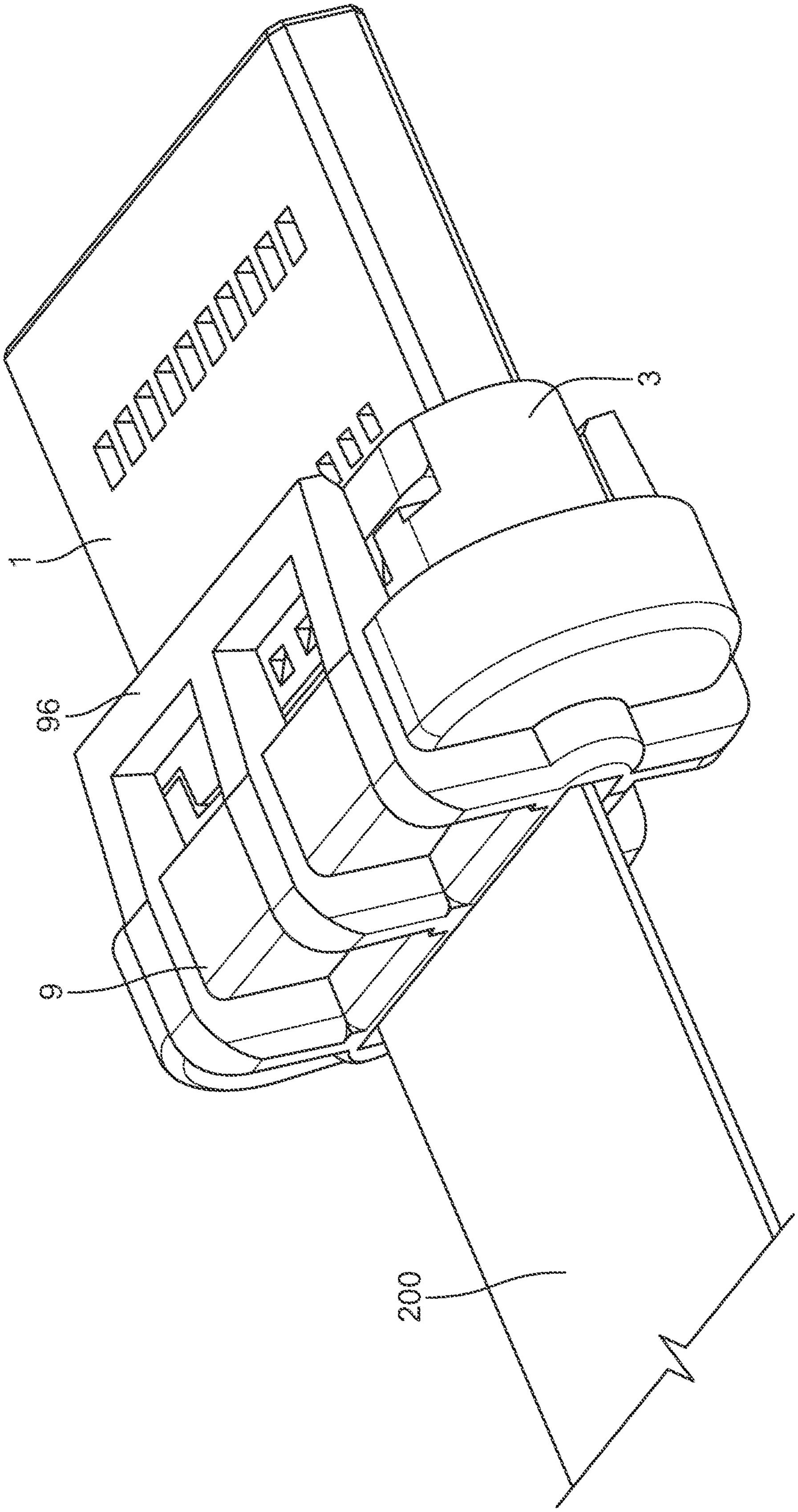
FIG. 10 is a side perspective view of the assembled connector of FIG. 7 with the flat flexible cable inserted therein.

As shown most clearly in FIG. 7, the radially-outward facing surface 73 of the seal (e.g., a ribbed perimeter surface) is exposed around or extends radially beyond the inner housing 3 for engaging with a sealing surface 85 (e.g., a radially-inward facing surface) of the mating connector or header 8. With the connector assembly 100 installed within a receptacle 92 the header 8, the perimeter face 73 of the seal 7 contacts the sealing face 85 of the header for sealing the entire connector assembly. See FIGS. 11 and 12.

As shown in FIGS. 8-12, the exemplary FFC 200 includes a plurality of conductors 202 embedded within an insulation material 201. The conductors 202 may comprise metallic sheet or foil, such as copper foil, by way of example only, patterned in any desirable configuration. The insulation material 201, such as a polymer insulation material, may be applied to either side of the conductors 202 via an adhesive, resulting in an embedded conductor arrangement. One or more portions or windows of the insulation material 201 may be removed (or may not be initially applied) in select areas to expose sections of the otherwise embedded conductors 202. In the exemplary embodiment, a portion of a top surface 204 has been removed to define a single continuous window exposing the ends of each of the conductors 202 on a top side thereof, while a bottom portion 205 of the insulation material 214 remains present for added stability and strength. A plurality of openings 203 are formed through the FFC 200 between each pair of adjacent conductors 202. The openings 203 may be sized and positioned to receive the locking clips or latches 56 of each terminal 5 therethrough, permitting the first arms 53 of each terminal 5 to secure to the second arms 54 in a clamped position, and electrically connecting the terminals to the exposed conductors 202. In the exemplary embodiment, a portion 32' of each partitioning wall is adapted to engage with or through a corresponding opening 203 of the FFC 200. Once engaged and the outer housing 1 slid over the inner housing 3, the corresponding partitioning wall 15 is operative to capture the FFC 200 via the engaged partitioning walls 15,32 and the openings 203, preventing its inadvertent removal.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing defining a receptacle sized to receive a flat flexible cable;

a conductive terminal arranged within the receptacle and adapted to contact a conductor of the flat flexible cable;

a seal engaging with a front end of the housing and defining a first slot therethrough sized to receive the flat flexible cable; and a cover selectively fixed to the front end of the housing and arranged over the seal, the cover defining a second slot sized to receive the flat flexible cable and including a mating connector latch adapted to secure the connector to a mating connector.

2. The connector of claim 1, wherein the cover includes a perimeter wall defining a cavity receiving the seal.

3. The connector of claim 2, wherein one of the cover or the housing includes a connector latch and the other one of the cover or the housing defines an opening including an internal catch, the connector latch received within the opening and engaging with the catch for securing the cover to the housing.

4. The connector of claim 3, wherein the connector latch protrudes from the cavity of the cover, and the housing defines the opening receiving the connector latch.

5. The connector of claim 4, wherein the housing includes:

an outer housing having a first end adapted to engage with a mating electrical connector; and an inner housing slidably connected to the outer housing and defining an open end of the receptacle.

6. The connector of claim 5, wherein the inner housing defines the opening receiving the connector latch of the cover, the connector latch of the cover extending through an opening in the seal.

7. The connector of claim 6, wherein the terminal includes a first arm and a second arm attached to the first arm, the first and second arms defining an opening therebetween for receiving an exposed conductor of the flat flexible cable, the first arm movable relative to the second arm for clamping the flat flexible cable therebetween.

8. The connector of claim 7, wherein the terminal further comprises a locking clip for fixing the first arm relative to the second arm in a clamped position.

9. The connector of claim 7, wherein the outer housing biases the first arm in a direction of the second arm for clamping the flat flexible cable as the inner housing is slidably received within the outer housing.

10. The connector of claim 9, further comprising a plurality of terminals arranged within the receptacle of the housing, the outer housing biasing the first arms of each terminal simultaneously as the inner housing is slidably received within the outer housing.

11. The connector of claim 10, wherein the inner housing is slidably received within the outer housing in a first position in which the outer housing does not engage with the first arms of the terminals and the flat flexible cable may be inserted into the opening of the terminals, the inner housing slidable from the first position to a second position within the outer housing in which the outer housing biases the first arms of the terminals into a clamped position.

12. The connector of claim 11, wherein the inner and outer housing include corresponding latching features for fixing the inner housing to the outer housing in the second position.

13. The connector of claim 11, wherein each terminal includes a latching tab engaging with an opening formed in the outer housing with the inner housing in the first position and preventing the inner housing from being removed from the outer housing.

14. A connector assembly, comprising:

a flat flexible cable having a plurality of conductors embedded within an insulation material, a portion of each conductor exposed through a window defined in the insulation material; and a connector, including:

a housing including an outer housing and an inner housing slidably received within the outer housing, the inner and outer housings defining a receptacle for receiving the flat flexible cable;

a plurality of conductive terminals arranged within the receptacle for contacting a respective one of the exposed conductor portions of the flat flexible cable;

a seal engaging with the housing proximate an open end of the receptacle and defining a first slot therethrough aligned with the receptacle for receiving the flat flexible cable; and a cover arranged over the seal and defining a second slot corresponding to the first slot of the seal and receiving the flat flexible cable, the cover selectively secured to the housing.

15. The connector assembly of claim 14, wherein the conductors of the flat flexible cable are exposed on an end section of the cable and on one of a top or bottom side of the cable.

16. The connector assembly of claim 14, wherein the seal is arranged within a recessed cavity defined by a perimeter wall of the cover.

17. The connector assembly of claim 16, wherein the seal engages with the front face of the inner housing with the cover secured to the housing.

18. The connector assembly of claim 17, wherein a receiving space is defined between the perimeter wall of the cover and an outer peripheral sealing surface of the seal.

19. The connector assembly of claim 18, further comprising a mating connector engaging with the connector assembly, a front end of the mating connector inserted into the receiving space and forming a seal with the outer peripheral sealing surface of the seal.

20. A connector, comprising:

a housing defining a receptacle sized to receive a flat flexible cable and a latch opening including a catch;

a conductive terminal arranged within the receptacle and adapted to contact a conductor of the flat flexible cable;

a seal engaging with a front end of the housing and defining a first slot therethrough sized to receive the flat flexible cable; and a cover selectively fixed to the front end of the housing and arranged over the seal, the cover including:

a second slot sized to receive the flat flexible cable;

a perimeter wall defining a cavity receiving the seal;

a latch protruding from the cavity received within the latch opening of the housing and engaging with the catch for securing the cover to the housing.

21. A connector, comprising:

a housing defining a receptacle sized to receive a flat flexible cable, including:

an outer housing having a first end adapted to engage with a mating electrical connector; and an inner housing slidably connected to the outer housing and defining an open end of the receptacle;

a conductive terminal arranged within the receptacle and adapted to contact a conductor of the flat flexible cable, including:

a first arm; and a second arm attached to the first arm, the first and second arms defining an opening therebetween for receiving an exposed conductor of the flat flexible cable, the first arm movable relative to the second arm for clamping the flat flexible cable therebetween;

a seal engaging with a front end of the housing and defining a first slot therethrough sized to receive the flat flexible cable; and a cover selectively fixed to the front end of the housing and arranged over the seal, the cover defining a second slot sized to receive the flat flexible cable, wherein the inner housing is slidably within the outer housing between:

a first position in which the flat flexible cable may be inserted into the opening of the terminal; and a second position in which the outer housing biases the first arm of the terminals into a clamped position securing the flat flexible cable between the first arm and the second arm.

22. The connector of claim 21, wherein the terminal further comprises a locking clip for fixing the first arm relative to the second arm in the clamped position.

23. The connector of claim 21, wherein the terminal includes a latching tab engaging with an opening formed in the outer housing with the inner housing in the first position and preventing the inner housing from being removed from the outer housing.

* * * * *